(12) United States Patent
Yavuz et al.

(10) Patent No.: US 9,346,918 B2
(45) Date of Patent: May 24, 2016

(54) DISULFIDE-LINKED COVALENT ORGANIC POLYMERS AND METHOD OF PREPARING THE SAME

(71) Applicant: Korea Advanced Institute of Science and Technology, Daejeon (KR)

(72) Inventors: Cafer T. Yavuz, Daejeon (KR); Hasmukh Patel, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/597,709

(22) Filed: Jan. 15, 2015

(65) Prior Publication Data

US 2016/0017098 A1  Jan. 21, 2016

(30) Foreign Application Priority Data

Jul. 18, 2014 (KR) ........................ 10-2014-0091025

(51) Int. Cl.
*C07C 321/00* (2006.01)
*C08G 75/14* (2006.01)
*B01J 20/26* (2006.01)

(52) U.S. Cl.
CPC .............. *C08G 75/14* (2013.01); *B01J 20/262* (2013.01)

(58) Field of Classification Search
CPC .................................. C08G 75/15; B01J 20/26
See application file for complete search history.

(56) References Cited

U.S. PATENT DOCUMENTS

2014/0066589 A1  3/2014 Puskas et al.

FOREIGN PATENT DOCUMENTS

EP  1777269 A1  4/2007

OTHER PUBLICATIONS

M. Yavuz et al. (RSC Adv., 2014, 4, 24320-24323).*
Bang, E., et al., "Poly(disulfide)s", "Chemical Science", 2012, pp. 1752-1763, vol. 3.
Debnath, S., et al., "Dipeptide-Based Low-Molecular-Weight Efficient Organogelators and Their Application in Water Purification", "Chem. Eur. J.", 2008, pp. 6870-6881, vol. 14.
Fan, Z., et al., "Superhydrophobic Mesoporous Graphene for Separation and Absorption", "ChemPlusChem", Jul. 18, 2013, pp. 1282-1287, vol. 78.
Gui, X, et al., "Carbon Nanotube Sponges", "Adv. Mater.", 2010, pp. 617-621, vol. 22.
Gupta, V., et al., "Chemical treatment technologies for waste-water recycling—an overview", "RSC Advances", 2012, pp. 6380-6388, vol. 2.
Khin, M., et al., "A review on nanomaterials for environmental remediation", "Energy Environ. Sci.", 2012, pp. 8075-8109, vol. 5.
Li, A., et al., "Superhydrophobic conjugated microporous polymers for separation and adsorption", "Energy Environ. Sci.", 2011, pp. 2062-2065, vol. 4.

(Continued)

*Primary Examiner* — Shane Fang
(74) *Attorney, Agent, or Firm* — Hultquist, PLLC; Steven J. Hultquist (57) ABSTRACT

A disulfide-linked covalent organic polymer and a preparation method thereof are described, and more particularly a disulfide-linked covalent organic polymer prepared by a disulfide formation reaction, a preparation method thereof, and the use of the organic polymer as an organic solvent absorbent. A disulfide-linked covalent organic polymer prepared according to the disclosure may be used as an absorbent capable of selectively absorbing various organic solvents in aqueous solutions or wastewater.

11 Claims, 9 Drawing Sheets

(56) References Cited

OTHER PUBLICATIONS

Li, M., et al., "1,4-Dioxane biodegradation at low temperatures in Arctic groundwater samples", "Water Research", Feb. 10, 2010, pp. 2894-2900, vol. 44.

Lv, Y., et al., "Thiolene click chemistry: a facile and versatile route for the functionalization of porous polymer monoliths", "Analyst", 2012, pp. 4114-4118, vol. 137.

Mahendra, S., et al., "Kinetics of 1,4-Dioxane Biodegradation by Monooxygenase-Expressing Bacteria", "Environ. Sci. Technol.", Jul. 25, 2006, pp. 5435-5442, vol. 40, No. 17.

Mahendra, S., et al., "The impact of chlorinated solvent co-contaminants on the biodegradation kinetics of 1,4-dioxane", "Chemosphere", Dec. 10, 2012, pp. 88-92, vol. 91.

Marci, G., et al., "Environmentally sustainable production of cellulose-based superabsorbent hydrogels", "Green Chem.", Mar. 16, 2006, pp. 439-444, vol. 8.

Meng, Y., et al., "Aromatic disulfide polymers back to macrocyclic disulfide oligomers via cyclo-depolymerization reaction", "Polymer", Sep. 19, 2005, pp. 11117-11124, vol. 46.

Ono, T., et al., "Molecular Design of Superabsorbent Polymers for Organic Solvents by Crosslinked Lipophilic Polyelectrolytes", "Adv. Funct. Mater", Nov. 10, 2008, pp. 3936-3940, vol. 18.

Ou, M., et al., "A family of bioreducible poly(disulfide amine)s for gene delivery", "Biomaterials", Jul. 16, 2009, pp. 5804-5814, vol. 30.

Patel, H., et al., "Sorption of Nitrobenzene from Aqueous Solution on Organoclays in Batch and Fixed-Bed Systems", "Ind. Eng. Chem. Res.", Dec. 18, 2008, pp. 1051-1058, vol. 48.

Patel, H., et al., "High capacity carbon dioxide adsorption by inexpensive covalent organic polymers", "J. Mater. Chem.", 2012, pp. 8431-8437, vol. 22.

Patel, H., et al., "Exceptional organic solvent uptake by disulfide-linked polymeric networks", "RSC Adv.", May 27, 2014, pp. 24320-24323, vol. 4.

Patel, H., et al., "Noninvasive functionalization of polymers of intrinsic microporosity for enhanced $CO_2$ capture", "Chem. Commun.", 2012, pp. 9989-9991, vol. 48.

Patil, D., et al., "MIL-53(Al): An Efficient Adsorbent for the Removal of Nitrobenzene from Aqueous Solutions", "Ind. Eng. Chem. Res.", Aug. 10, 2011, pp. 10516-10524, vol. 50.

Richardson, S., "Environmental Mass Spectrometry: Emerging Contaminants and Current Issues", "Anal. Chem.", Dec. 6, 2011, pp. 747-778, vol. 84.

Rosenthal, E., et al., "Green Polymer Chemistry: Living Dithiol Polymerization via Cyclic Intermediates", "Biomacromolecules", Dec. 1, 2011, pp. 154-164, vol. 13.

Sonmez, H., et al., "Cross-Linked Poly(orthocarbonate)s as Organic Solvent Sorbents", "Macromolecules", Feb. 3, 2005, pp. 1623-1626, vol. 38.

Sparks, B., et al., "Mussel-Inspired Thiol-Ene Polymer Networks: Influencing Network Properties and Adhesion with Catechol Functionality", "Chem. Mater.", Aug. 30, 2012, pp. 3633-3642, vol. 24.

Theron, J., et al., "Nanotechnology and Water Treatment: Applications and Emerging Opportunities", "Critical Reviews in Microbiology", 2008, pp. 43-69, vol. 34.

Xu, Z., et al., "Applications of Porous Resin Sorbents in Industrial Wastewater Treatment and Resource Recovery", "Critical Reviews in Environmental Science and Technology", 2003, pp. 363-389, vol. 33.

Xue, Z., et al., "Superoleophilic and superhydrophobic biodegradable material with porous structures for oil absorption and oil-water separation", "RSC Adv.", Oct. 20, 2013, pp. 23432-23437, vol. 3.

Zhang, Z., et al., "Organic semiconductor for artificial photosynthesis: water splitting into hydrogen by a bioinspired C3N3S3 polymer under visible light irradiation", "Chem. Sci.", 2011, pp. 1826-1830, vol. 2.

Zhang, Y., et al., "Solvothermal synthesis of carboxyl and amido functionalized mesoporous resins for water treatments", "J. Mater. Chem.", Dec. 23, 2009, pp. 4609-4614, vol. 20.

Pan, B., et al., "Development of polymeric and polymer-based hybrid adsorbents for pollutants removal from waters", "Chemical Engineering Journal", 2009, pp. 19-29, vol. 151.

\* cited by examiner

COP-66 (before)

COP-66 (after soaking for 12 h)

DISULFIDE-LINKED COVALENT ORGANIC POLYMERS AND METHOD OF PREPARING THE SAME

CROSS-REFERENCE TO RELATED APPLICATION

This application claims priority under the provisions of 35 U.S.C. §119 of Korean Patent Application No. 10-2014-0091025 filed Jul. 18, 2014. The disclosure of Korean Patent Application No. 10-2014-0091025 is hereby incorporated herein by reference in its entirety, for all purposes.

TECHNICAL FIELD

The present invention relates to a disulfide-linked covalent organic polymer and the preparation method thereof, and more particularly to a disulfide-linked covalent organic polymer prepared by a disulfide formation reaction, a preparation method thereof, with the usages of the organic polymer as an organic solvent absorbent.

BACKGROUND ART

Polymers containing repeated disulfide bonds have received a great deal of attention due to dynamic covalent bonds that are easily broken and formed again (E. K. Bang et al. *Chem. Sci.*, 2012, 3:17521763; E. Q. Rosenthal et al. *Biomacro-molecules*, 2012, 13, 154-164; Y. Q. Lv et al. *Analyst*, 2012, 137, 4114-4118.1-3). The application of poly(disulfide)s include industrial plastics, medical materials, and catalysts. Organic solvents are frequently used in the production of fine chemicals, petrochemical products, and medicines (Y. Z. Meng et al. *Polymer*, 2005, 46:11117-11124; M. Ou et al. *Biomaterials*, 2009, 30:5804-5814; B. J. Sparks et al. *Chem. Mater.*, 2012, 24:3633-3642; Z. Z. Zhang et al. *Chem. Sci.*, 2011, 2:1826-1830).

Wastewaters discharged from reactors in industries contain heavy concentration of organic solvents that are mixed in water. Thus, the development of effective and low-cost technology for removing toxic solvents from wastewater is crucial in technical and environmental terms. Removal of organic pollutants from wastewater has been widely studied through physical, chemical and biological technologies (V. K. Gupta et al. *RSC Adv.*, 2012, 2:6380-6388; Z. Y. Xu et al. *Crit. Rev. Environ. Sci. Technol.*, 2003, 33:363-389; J. Theron et al. *Crit. Rev. Microbiol.*, 2008, 34:43-69.8-10).

Some materials such as activated carbon, porous silica, zeolites, organic clays, metal organic frameworks and membranes have been studied to remove toxic organic compounds from wastewater (V. K. Gupta et al. *RSC Adv.*, 2012, 2:6380-6388; M. M. Khin et al. *Energy Environ. Sci.*, 2012, 5:80758109; H. A. Patel et al. *Ind. Eng. Chem. Res.*, 2009, 48:10511058; D. V. Patil et al. *Ind. Eng. Chem. Res.*, 2011, 50:1051610524; B. J. Pan et al. *Chem. Eng. J.*, 2009, 151:1929; S. Debnath et al. *Chem. Eur. J.*, 2008, 14:6870-6881; Y. L. Zhang et al. *J. Mater. Chem.*, 2010, 20:4609-4614). Biological decomposition of organic pollutants in aqueous solutions or wastewater is also a promising method of a sustainable and environmentally friendly industry (S. Mahendra et al. *Chemosphere*, 2013, 91:88-92).

In several recent years, as the development of polymer materials with functionalities and controllable pore geometries has been of increasing interest, the range of application thereof has been expanded (H. A. Patel et al. *J. Mater. Chem.*, 2012, 22:8431-8437; H. A. Patel. et al. *Chem. Commun.* 2012, 48:9989-9991).

Polymers and their derivatives, including poly(acrylic acid), cellulose, poly(ortho-carbonate) as a carbon-containing material, microcrystalline polymers, and poly(lactic acid), have been studied as highly absorbent materials for removing oils and organic solvents from water (T. Ono et al. *Adv. Funct. Mate* 2008, 18:3936-3940; G. Marci et al. *Green Chem.*, 2006, 8:439-444; Z. L. Fan et al. *ChemPlus Chem*, 2013, 78:1282-1287; X. C. Gui et al. *Adv. Mater.*, 2010, 22:617-621; H. B. Sonmez et al. *Macromolecules*, 2005, 38:1623-1626; A. Li Et al. *Energy Environ. Sci.*, 2011, 4:2062-2065; Z. X. Xue et al. *RSC Adv.*, 2013, 3:23432-23437). Such materials have a disadvantage in that they are synthesized using expensive catalysts and monomers only at high temperatures, and also entail a problem in that they cannot remove highly concentrated solvents mixed with aqueous solutions.

Thus, there is a need for the development of polymer materials that are recyclable under catalyst-free mild conditions with ability to effectively absorb only organic solvents in aqueous solutions or wastewater.

Accordingly, the present inventors have prepared a disulfide-linked covalent organic polymer from a monomer having a terminal thiol group (—S—H), and found that the prepared organic polymer can selectively absorb only organic solvents on aqueous solutions or wastewater, thereby completing the present invention.

DISCLOSURE

It is an object of the present invention to provide a disulfide-linked covalent organic polymer having an excellent ability to selectively absorb organic solvents in aqueous solutions or wastewater, and a preparation method thereof.

To achieve the above object, the present invention provides a disulfide-linked organic polymer represented by the following Formula 1 or 2:

Formula 1

Formula 2 wherein n is an integer ranging from 10 to 20,000.

The present invention also provides a method of preparing a disulfide-linked organic compound, the method comprising the steps of:

(a) allowing a trivalent or tetravalent aliphatic monomer containing a thiol group to react with an oxidizing agent, followed by precipitation in a polar protic solvent to obtain a precipitate; and (b) soaking the precipitate, obtained in step (a), in an organic solvent to remove unreacted monomer, and excess oxidizing agent thereby obtaining a gel-like polymer.

The present invention also provides a method of using the above-described disulfide-linked organic polymer as an organic solvent absorbent.

The present invention also provides an organic solvent absorbent comprising the above-described disulfide-linked organic polymer.

BRIEF DESCRIPTION OF THE DRAWINGS

FIG. 5 shows the uptake of each solvent in each of COP-65 (FIG. 5A) and COP-66 (FIG. 5B) under atmospheric conditions.

BEST MODE

Unless defined otherwise, all technical and scientific terms used herein have the same meaning as commonly understood by one of ordinary skill in the art to which the invention pertains. Generally, the nomenclature used herein and the experiment methods, which will be described below, are those well known and commonly employed in the art. Description of the same elements that not important will be omitted to avoid redundancy.

In the present invention, a disulfide-linked covalent organic polymer was easily prepared without using a catalyst, and was found to have an excellent ability to absorb organic solvents. Particularly, it was found that the disulfide-linked covalent organic polymer provides an absorbent that selectively absorbs only organic solvents in aqueous solutions or wastewater.

The present invention provides an easy method of synthesizing a disulfide-linked polymer network using a functional monomer for effectively polymerizing thiol by a disulfide formation reaction belonging to click chemistry (Y. Q. Lv et al., Analyst, 2012, 137:41144118). Disulfide linkage having relatively weak bonding strength can be achieved by a simple chemical reaction of thiol group (—S—H) with a high yield under mild conditions in an environment that does not require special conditions. In addition, because the reaction rate is high, the reaction can be performed even in a bulk condition or in a solvent-free condition. Furthermore, reactants are not sensitive to water and oxygen, the reaction conditions are not strict. Polymers prepared through the disulfide formation reaction are compounds prepared through a radical reaction, but have a very homogeneous network structure and very low polymerization shrinkage.

In an example of the present invention, trimethylolpropane tris(3-mercaptopropionate) and pentaerythritol tetrakis(3-mercaptopropionate) were used as trivalent and tetravalent aliphatic monomers, respectively. The two compounds are monomers having a terminal thiol (—S—H) group, and are inexpensive. In addition to the two compounds, thiocyanuric acid that is an aromatic monomer was reacted with sodium hydroxide or potassium iodide as an oxidizing agent, and the reaction product was found to be a disulfide polymer. As a result, it was found that, in addition to aliphatic compounds having a thiol group, aromatic compounds can also be synthesized into disulfide-linked organic polymers.

Thus, in one aspect, the present invention is directed to a disulfide-linked organic polymer represented by the following Formula 1 or 2:

Formula 1

Formula 2 wherein n is an integer ranging from 10 to 20,000.

The organic polymer represented by Formula 1 was synthesized from trimethylolpropane tris(3-mercaptopropionate) that is a trivalent thiol (—S—H) monomer, and the organic polymer represented by Formula 2 was synthesized using the same oxidizing agent and reaction conditions as those used for the synthesis of the compound of Formula 1, except that pentaerythritol tetrakis(3-mercaptopropionate) that is a tetravalent thiol (—S—H) monomer was used. The reaction products were gel-like, amorphous polymers having a rubber-like appearance.

Thus, in another aspect, the present invention is directed to a method of preparing a disulfide-linked organic compound, the method comprising the steps of:

(a) allowing a trivalent or tetravalent aliphatic monomer containing a thiol group to react with an oxidizing agent, followed by precipitation in a polar protic solvent to obtain a precipitate; and (b) soaking the precipitate, obtained in step (a), in an organic solvent to remove unreacted monomer and excess oxidizing agent, thereby obtaining a gel-like polymer.

In the present invention, the trivalent aliphatic monomer may be trimethylolpropane tris(3-mercaptopropionate), and the tetravalent aliphatic monomer may be pentaerythritol tetrakis(3-mercaptopropionate).

In the present invention, the oxidizing agent is preferably selected from the group consisting of dimethyl sulfoxide (DMSO), sodium hydroxide (NaOH), and potassium iodide (KI). More preferably, the oxidizing agent that is used in the present invention is dimethyl sulfoxide (DMSO).

In the present invention, the polar protic solvent is preferably selected from the group consisting of water and alcohols. More preferably, methanol is used as the solvent.

In the present invention, the organic solvent is preferably selected from the group consisting of tetrahydrofuran (THF), acetone, N,N-dimethylformamide (DMF), and 1,2-dichloroethane (DCE). More preferably, tetrahydrofuran (THF) is used.

In the present invention, the reaction in step (a) may be performed at a temperature of 70-100° C. If the reaction temperature is lower than 70° C., the reaction will occur slowly, and if the reaction temperature is higher than 100° C., DMSO will evaporate rapidly, or the monomer will be degraded.

In the present invention, the precipitate of step (a) is preferably soaked 2-6 times in the organic solvent in step (b) in order to remove unreacted monomer therefrom. If the number of soaking is less than 2, the purity of the polymer will be low, and after $6^{th}$ wash, change is purity is insignificant.

In order to test the absorption ability of various organic solvents with the disulfide-linked organic polymer that was prepared in the present invention, the disulfide-linked organic polymer was dried, and then added to a vial together with an organic solvent. The vial was placed in a stirring machine, followed by stirring for 12 hours. After stirring, the vial was visually observed, and the organic solvent was removed. The weight of the polymer that absorbed the organic solvent by the reaction was measured, and the ability of the polymer to absorb the organic solvent was determined based on the difference in the polymer weight between before and after the reaction. Also, to recycle the disulfide-linked organic polymer, the polymer should be heated to the boiling point of the absorbed organic solvent to evaporate the absorbed organic solvent, and the remaining disulfide-linked organic polymer is recyclable. In the present invention, the polymer was recycled 10 times, and it was found that the number of recycling of the polymer did not influence the ability of the polymer to absorb the organic solvent.

Also, the disulfide-linked organic polymer was added to a mixture of water, dioxane and THF in order to examine whether it absorbs only dioxane and THF without absorbing water. It could be seen that the disulfide-linked organic polymer efficiently absorbed only dioxane and THF, suggesting that the polymer has an excellent ability to absorb the organic solvent mixed with water in an aqueous solution.

The disulfide-linked organic polymer prepared in the present invention is not degraded in various solvents, and is stable at a temperature of up to 310° C. under oxidative conditions. Thus, it can selectively absorb organic solvents in aqueous solutions, and can also be used as an effective organic solvent absorbent in water treatment processes.

Thus, in still another aspect, the present invention is directed to a method of using the above-described disulfide-linked organic polymer as an organic solvent absorbent.

In yet another aspect, the present invention is directed to an organic solvent absorbent comprising the above-described disulfide-linked organic polymer.

The disulfide-linked organic polymer prepared in the present invention is obtained as an amorphous gel-like material after synthesis. In this gel state, the organic polymer may be used as an organic solvent absorbent, and may be used in other various applications, because of its thermal stability and the property that does not absorb water.

In the present invention, the organic solvent is absorbed by the organic polymer of the present invention may be present in aqueous solutions or wastewater.

Hereinafter, the present invention will be described in further detail with reference to examples. However, it will be obvious to those skilled in the art that these examples are for illustrative purposes only and are not intended to limit the scope of the present invention. The terms and abbreviations used in the examples are as follows. COPs: disulfide-linked covalent organic polymers (herein, this term is used to designate both COP-65 and COP-66); COP-65: novel covalent organic polymer 65 (synthesized from a trivalent monomer); COP-66: novel covalent organic polymer 66 (synthesized from a tetravalent monomer); DMSO: dimethyl sulfoxide; trimethyllolpropane tris(3-mercaptopropionate); tetra-thiol; pentaerythritol tetrakis(3-mercaptopropionate); thiol; and THF: tetrahydrofuran.

Example 1

Synthesis of COPs 1-1: Synthesis of COP-65

5 mL of trimethylolpropane tris(3-mercaptopropionate) (98% pure; Sigma-Aldrich) was added to 25 mL of DMSO (99.5% pure; SAMCHUN). The solution was heated at 80° C. for 24 hours with intensive stirring. The reaction product was cooled at room temperature, and an excessive amount (50 mL) of methanol (98% pure; SAMCHUN) was added thereto to form a precipitate. The precipitate was centrifuged and soaked in THF (98% pure; SAMCHUN) for 12 hours. The THF was removed, and the precipitate was soaked again in fresh THF for 12 hours. The soaking process was repeated four times. Finally, the resulting gel-like material was dried at 50° C. for 2 hours, and dried at 100° C. under a vacuum for 5 hours. As a result, COP-65 was synthesized.

Elemental analysis of CHNSO: % C: 44.26 (45.55), % H: 6.12 (5.86), % S: 24.15 (24.32), % O: 24.95 (24.27).

The former values in the above elemental analysis are found values, and the parenthesized values are theoretical values.

1-2: Synthesis of COP-66

COP-66 was synthesized in the same manner as described in Example 1-1, except that tetra-thiol (98% pure; Sigma-Aldrich) was used.

Figure 1:
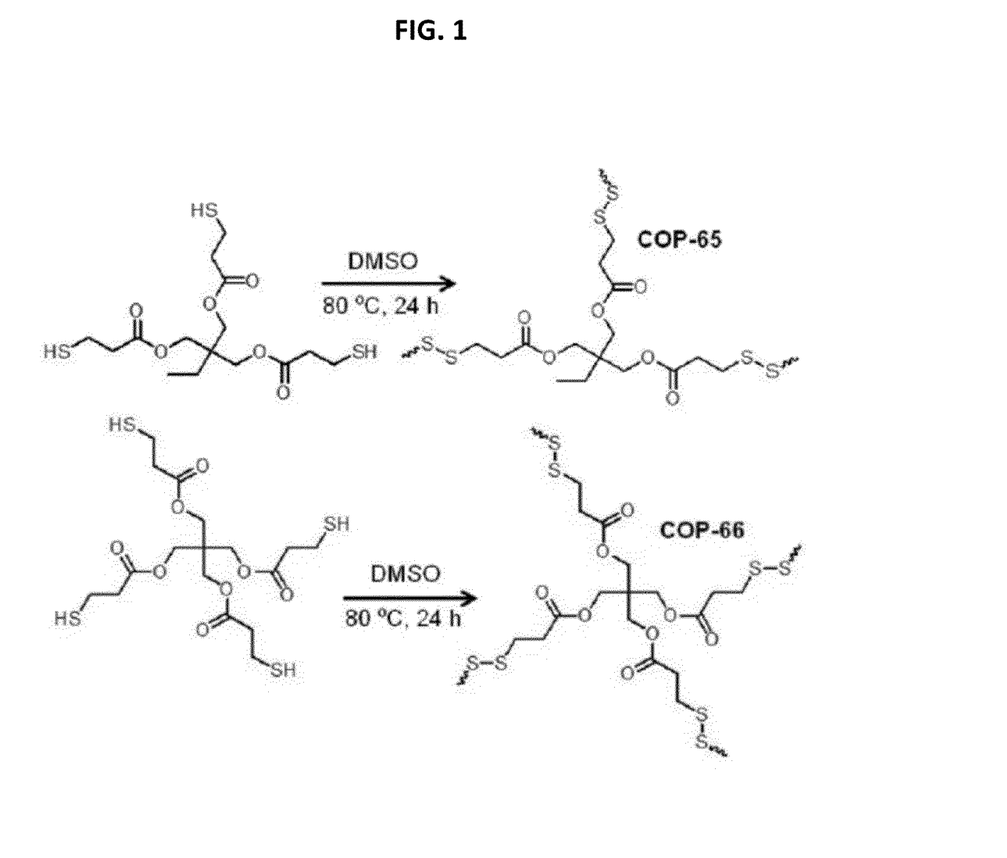
FIG. 1 shows oxidative reactions in which each of trimethylolpropane tris(3-mercaptopropionate) and pentaerythritol tetrakis(3-mercaptopropionate) is reacted with DMSO under mild conditions to form disulfide-linked covalent organic polymers (COPs).

Elemental analysis of CHNSO: % C: 42.31 (42.13), % H: 5.38 (4.99), % S: 25.12 (26.47), % O: 26.71 (26.41) (shown in FIG. 1 of reaction schemes for COP-66 and COP-65).

Example 2

Measurement of Chemical Shifts

CP/MAS $^{13}$C-NMR spectra were recorded with a Bruker DMX400 NMR spectrometer. Solid state-cross polarization magic angle spinning (CP/MAS) NMR spectra were recorded with a Bruker Anence III 400 W B NMR spectrometer.

Figure 2A:
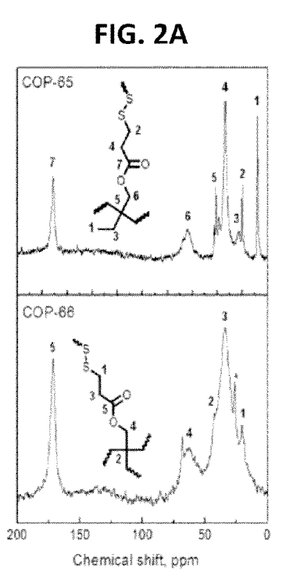
FIG. 2A shows the results of CP/MAS $^{13}$C-NMR spectrometry of COPs.

The chemical shifts of COP-65 and COP-66, synthesized in Example 1, were measured with a CP/MAS $^{13}$CNMR spectrometer, and as a result, COP-65 was confirmed at 171.5, 64.2, 41.6, 34.1, 23.5 and 7.6, and COP-66 was confirmed at 171.5, 63.4, 42.5, 34.4 and 20.3. The characteristic chemical shifts demonstrated the formation of a disulfide-linked polymer network (see FIG. 2A).

Example 3

Measurement of Vibration Peaks

FT-IR spectra were recorded with a Perkin-Elmer FT-IR spectrometer using KBr pellets.

Figure 2B:
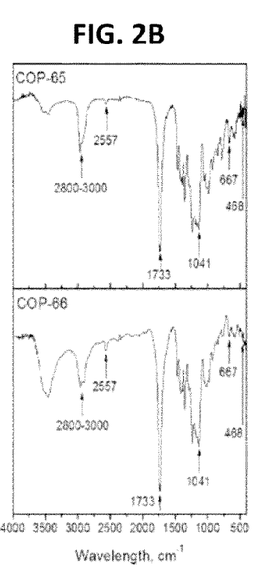
FIG. 2B shows the FT-IR spectra of COPs.

The vibration peaks of COP-65 and COP-66, synthesized in Example 1, were measured with a FT-IR spectrometer, and as a result, the characteristic vibration peaks of —C=O, —C—O, —C—S— and —S—S— were observed at 1733, 1041, 667 and 468 cm$^{-1}$, respectively, and a terminal —S—H— group appeared at a small peak of 2557 cm$^{-1}$ in the network. Also, it was found that stretching signals at 2800-3000 nm are associated with —C—H groups (see FIG. 2B).

Example 4

Thermogravimetric Analysis (TGA)

Thermogravimetric analysis (TGA) was performed with a NETZSCH-TG 209 F3 analyzer by heating a sample to 800° C. at a rate of 10/min in an oxygen or nitrogen atmosphere.

Figure 2C:
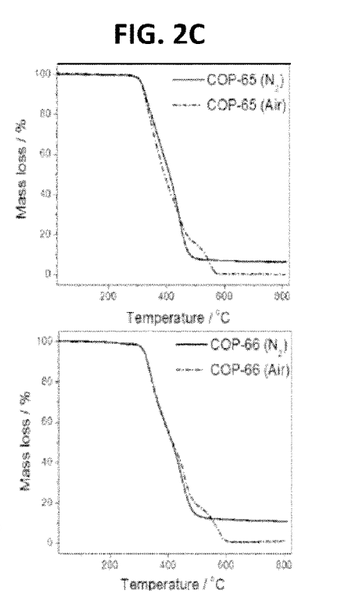
FIG. 2C shows thermogravimetric curves of COPs.

COP-65 and COP-66, synthesized in Example 1, were analyzed by thermogravimetric analysis, and as a result, it was observed that, while decomposition of COPs was completed under oxidative conditions, the amounts of COP-65 and COP-66 remaining after heating to 800° C. in an inert atmosphere were 0.98% and 1.39%, respectively. These results demonstrate single step decomposition caused by decomposition of the aliphatic chains of COPs. COP-65 and COP-66 were stable at a temperature of up to 310° C. in an inert atmosphere or an oxidative environment FIG. 2C).

Example 5

Swelling Test

Figure 3:
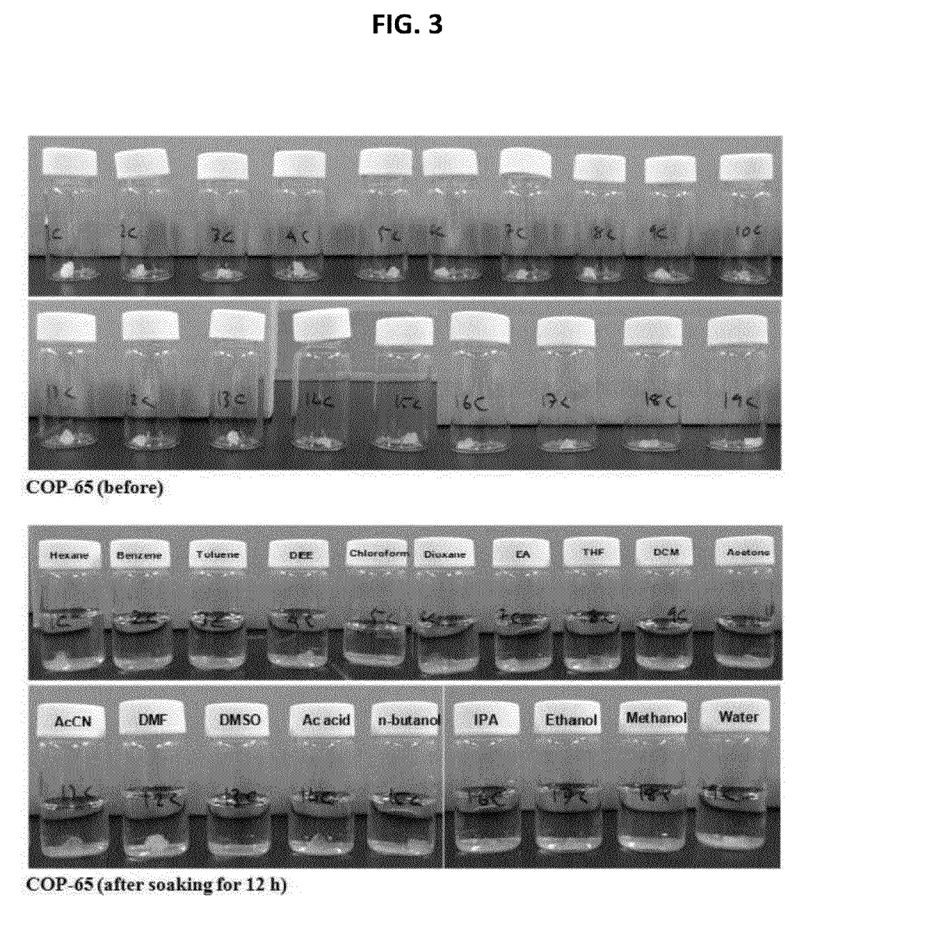
FIG. 3 depicts photographs showing the abilities of COP-65 to absorb various solvents, before and after reaction.
Figure 4:
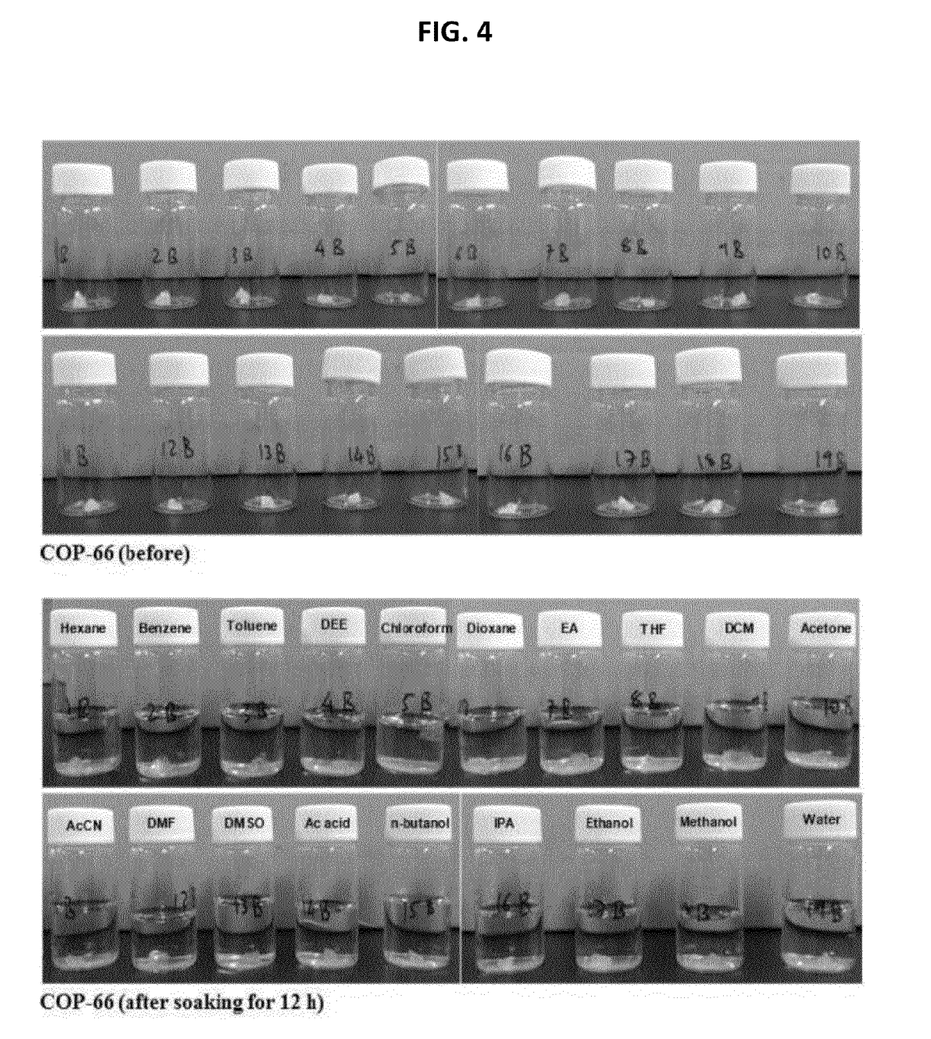
FIG. 4 depicts photographs showing the abilities of COP-66 to absorb various solvents, before and after reaction.

COPs synthesized in Example 1 were dried overnight at 80° C. under a vacuum. 0.5 g of each of COPs was separated from a solvent by filtration. To measure the final weight of swollen COPs, each of COPs was added to 5 mL of each of various organic solvents, and the solutions were continuously stirred at room temperature for 12 hours. COPs swollen by absorbing the organic solvents were separated from the solvents by filtration. Using the final weight of each of the swollen COPs, the difference between initial weight and final weight in the actual absorption of a given solvent was measured (FIGS. 3 and 4). The swollen COPs were easily recyclable several times by heating them to the boiling points of the solvents under a vacuum.

Figure 5A:
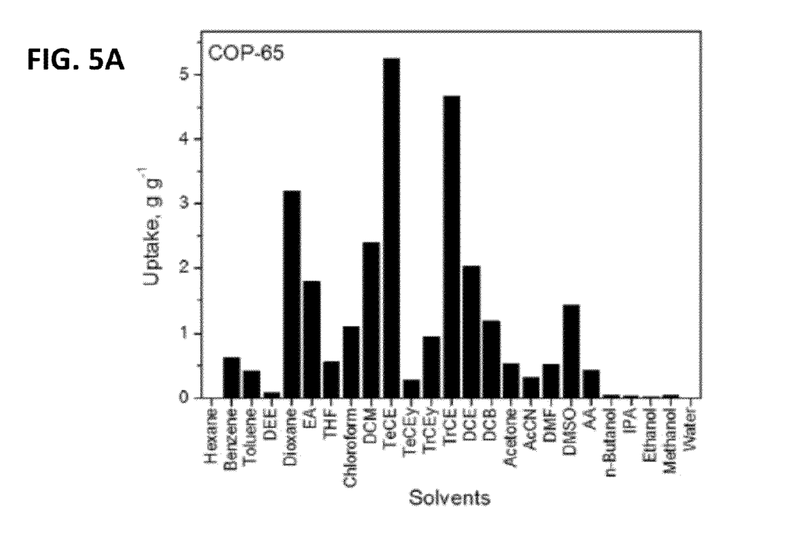
Figure 5B:
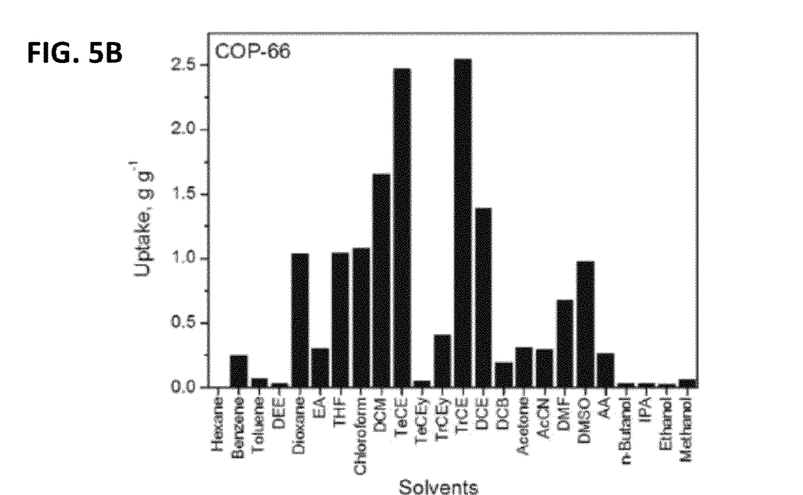

Various organic solvents that are industrially used in organic synthetic chemistry, including hexane, benzene, toluene, dimethyl ether (DME), chloroform, dioxane, ethylacetate (EA), tetrahydrofuran (THF), dichloromethane (DCM), 1,1,2,2-tetrachloroethane (TeCE), tetrachloroethylene (TeCEY), trichloroethylene (TrCEY), 1,1,2-trichloroethane (TrCE), 1,2-dichloroethane (DCE), 1,2-dichlorobenzene (DCB), acetone, acetonitrile (AcCN), dimethylformamide (DMF), dimethylsulfoxide (DMSO), acetic acid (AA), n-butanol, isopropyl alcohol (IPA), ethanol, methanol and water, were each treated with COP-65 and COP-66. FIG. 5A shows the uptake of the above-mentioned organic solvents in COP-65, and FIG. 5B show the uptake of the organic solvents in COP-66. As can be seen therein, COP-65 exhibited the highest uptakes for the chlorinated solvents TeCE and TrCE (5.3 and 4.7 g/g, respectively), and COPs exhibited high uptakes of TrCE (4.67 g/g in COP-65, and 1.39 g/g in COP-66). Such results indicate that the use of COPs is more effective for removal of organic solvents, compared to other water treatment methods.

In addition, it could be seen that the volume of COP particles increased after 12 hours of soaking in various organic solvents.

As indicated in Table 1 below, dioxane and THF, which are cyclic ethers, showed uptakes of 3.2 and 0.56 g/g in COP-65, and 1.03 and 1.04 g/g in COP-65, respectively, suggesting that these cyclic ethers easily swell COPs. Aromatic polar solvents, aliphatic ethers, or polar solvents containing a hydroxyl group, showed low uptakes in COPs. COP-65 having a trivalent aliphatic building block structure had a more flexible framework, and thus high ability to absorb organic solvents, compared to COP-66 having a tetravalent building block structure.

TABLE 1

| Solvents | Uptake, gg$^{-1}$ | |
|---|---|---|
| | COP-65 | COP-66 |
| Hexane | 0.0053 | 0.0058 |
| Benzene | 0.6348 | 0.2523 |
| Toluene | 0.4203 | 0.0706 |
| DME | 0.0904 | 0.0268 |
| Dioxane | 3.1963 | 1.0344 |
| Ethyl acetate (EA) | 1.7930 | 0.2983 |
| Tetrahydrofuran (THF) | 0.5630 | 1.0449 |
| Chloroform | 1.1055 | 1.0818 |
| Dichloromethane (DCM) | 2.3875 | 1.6552 |
| 1,1,2,2-tetrachloroethane (TeCE) | 5.2546 | 2.4718 |
| Tetrachloroethylene (TeCEY) | 0.2808 | 0.0469 |
| Trichloroethylene (TrCEY) | 0.9549 | 0.404 |
| 1,1,2-trichloroethane (TrCE) | 4.6751 | 2.5437 |
| 1,2-dichloroethane (DCE) | 2.0252 | 1.3885 |
| 1,2-dichlorobenzene (DCB) | 1.1972 | 0.1913 |
| Acetone | 0.5433 | 0.3090 |
| Acetonitrile (AcCN) | 0.3200 | 0.2915 |
| N,N-dimethylformamide (DMF) | 0.5287 | 0.6733 |
| Dimethyl sulfoxide (DMSO) | 1.4208 | 0.9765 |
| Acetic acid, glacial (AA) | 0.4313 | 0.2598 |
| n-Butanol | 0.0458 | 0.0302 |
| Isopropyl alcohol (IPA) | 0.03 | 0.0270 |
| Ethanol | 0.0229 | 0.0257 |
| Methanol | 0.0432 | 0.0597 |
| Water | 0.0108 | 0.0228 |

Example 6

Measurement of Uptake of Organic Solvent in Aqueous Solution

Figure 6:
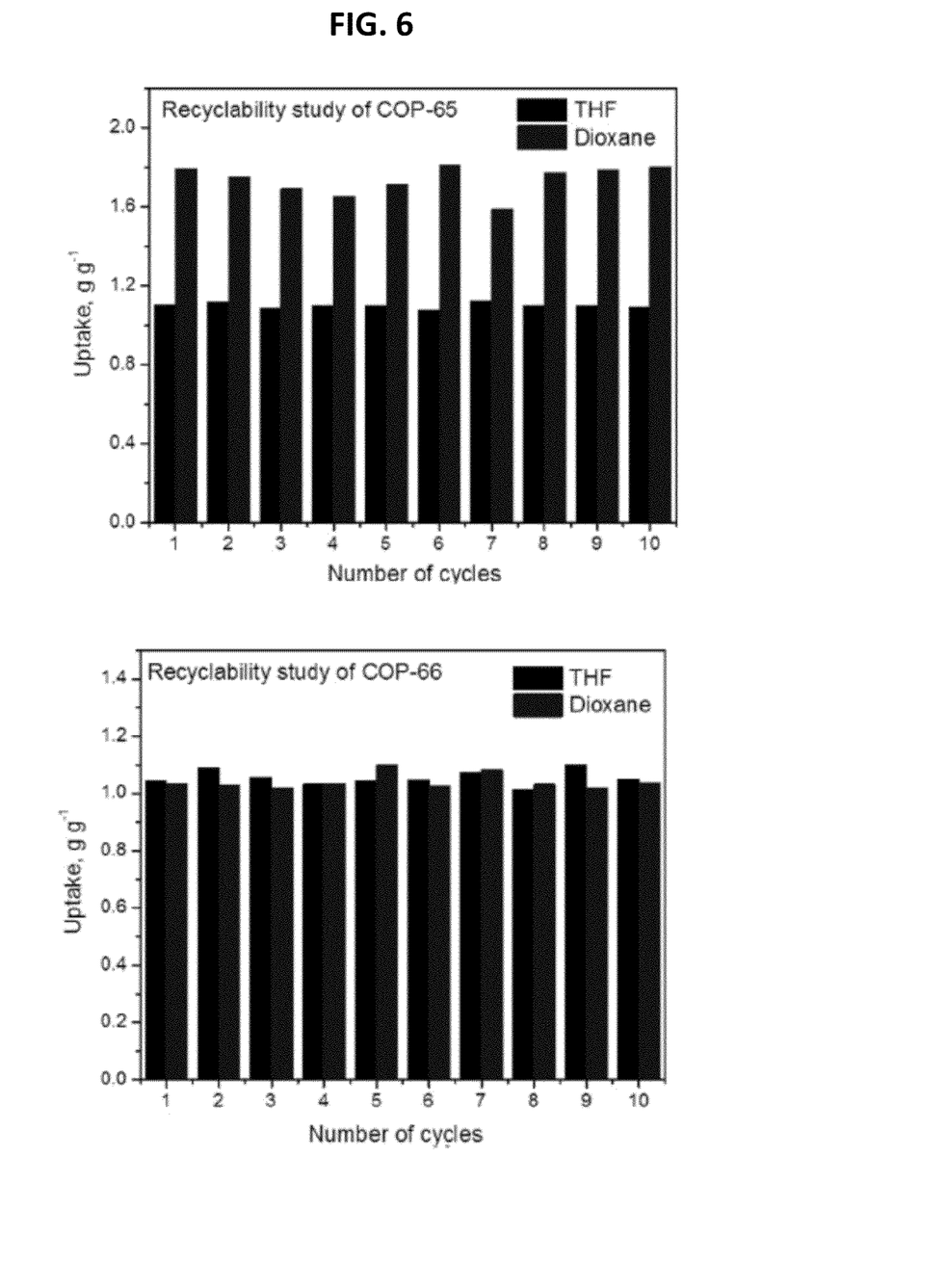
FIG. 6 is a graph showing the recyclability of each of COP-65 and COP-66 for THF and dioxane.

The COP-65 and COP-66 polymers synthesized in Example 1 were not decomposed in various solvents, and were stable at a temperature of up to 310° C. under oxidative conditions. COP-65 and COP-66 were simply recycled by heating them to temperatures closed to the boiling points of solvents. As can be seen in FIG. 6 (in which the x-axis indicates the number of cycles, and the y-axis indicates the uptake of organic solvents), the ability of COPs to absorb THF and dioxane did not decrease, even when these were recycled 1-10 times. From such results in FIG. 6, it can be seen that the organic polymers according to the present invention are also useful for treatment of wastewater containing organic solvents.

In other words, because COPs absorb small amounts of water (0.01 g/g in COP-65, and 0.02 g/g in COP-66), they can highly efficiently remove toxic organic solvents that are present in aqueous solution at high concentrations.

1,4-dioxane that is a cyclic ether is an industrial pollutant that pollutes a wide range of water environments, and was classified as a carcinogen by the US Environmental Protection Agency (EPA/635/R-09/005-F, 2010) (S. Mahendra et al. *Environ. Sci. Technol.*, 2006, 40, 5435-5442; M. Y. Li et al. *Water Res.*, 2010, 44, 2894-2900).

Dioxane is used as a major solvent stabilizer together with trichloroethane in the field of paper making, fabric production, vehicle cooling water, electronic products, insecticides and cosmetic products (S. D. Richardson, *Anal. Chem.*, 2012, 84, 747778).

Removal of dioxane is particularly very important, because the boiling point (100° C.) is very similar to that of dioxane (101° C.) THF is also an industrially important solvent in synthetic chemistry. It is not as toxic as dioxane, but prolonged exposure to THF may cause serious damage to kidney, liver and respiratory track (EPA/635/R-11/006F, 2012).

Figure 7A:
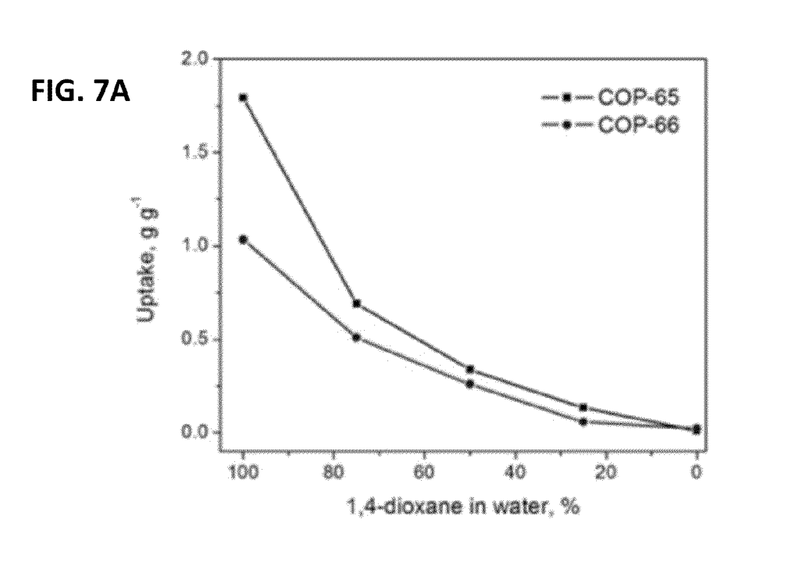
FIGS. 7A and 7B show the uptake of each of 1,4-dioxane (FIG. 7A) and THF (FIG. 7B) in water: dioxane/THF mixture.
Figure 7B:
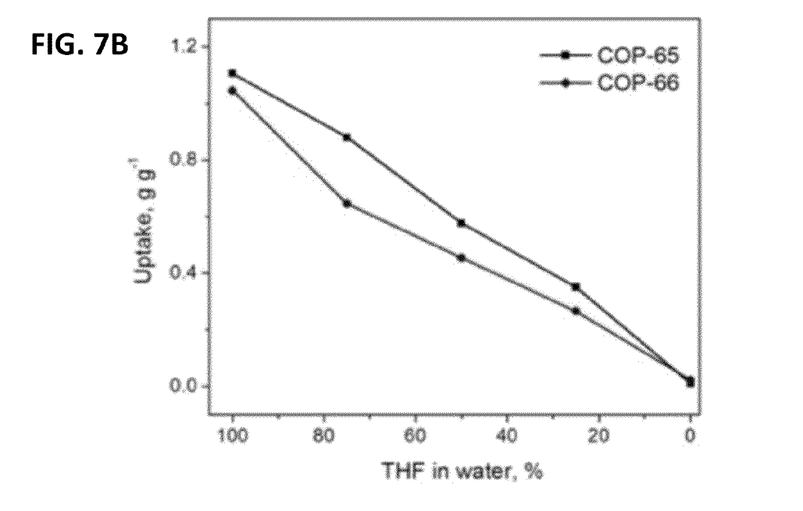

In order to test the ability of COPs, synthesized in Example 1, to absorb dioxane, a mixture of water and dioxane or THF (0, 20, 40, 60, 80 or 100%(v/v) dioxane or THF in water) was used in the test. As a result, as shown in FIG. 7A and FIG. 7B, the uptake of dioxane or THF in COPs decreased as the concentration of water increased. When the ratio of COP-65 and COP-66 as 50:50, the uptakes of dioxane were 0.34 and 0.26 g/g, respectively (FIG. 7A), and the uptakes of THF were 0.57 and 0.45 g/g, respectively (FIG. 7B). Such results demonstrated that COPs according to the present invention are useful for the removal of dioxane from a mixture of water/dioxane/THF. While COP-65 showed a dioxane uptake rate of 180%, COP-65 showed a dioxane uptake rate of 34% and a THF uptake rate of 57% in dioxane/THF:water (50:50). The high ability of COPs to absorb TrCE or DCE demonstrated that COPs can be used to purify monomeric raw materials for vinyl chloride production. Such results clearly suggest exceptional efficiency of COPs for the uptake of toxic solvents from water soluble solvents. The recyclability and stability of COPs can be considered to be the advantages of these organic polymer forms.

Example 7

Elementary Analysis of CHSNO of COPs

The elemental analysis of CHSNO of COPs was performed with an element analyzer Thermo-Quest Italia S. P. A. (CE Instruments).

CHSNO elements of COP-65 and COP-66, synthesized in Example 1, were analyzed with an element analyzer, and the results of the analysis are shown in Table 2 below and are as follows: for COP-65, % C: 44.26 (45.55), % H: 6.12 (5.86), % S: 24.15 (24.32), % O: 24.95 (24.27); and for COP-66, % C: 42.31 (42.13), % H: 5.38 (4.99), % S: 25.12 (26.47), % O: 26.71 (26.41). Herein, the former values in the above experimental values, and the values in the parenthesis are theoretical values. The experimental values were well consistent with the theoretical values, suggesting that the desired polymer networks were properly formed.

TABLE 2

| COPs | % C | | % H | | % O | | % S | |
|---|---|---|---|---|---|---|---|---|
| | Theo. | Exp. | Theo. | Exp. | Theo. | Exp. | Theo. | Exp. |
| COP-65 | 45.55 | 44.26 | 5.86 | 6.12 | 24.27 | 24.95 | 24.32 | 24.15 |
| COP-66 | 42.13 | 42.31 | 4.99 | 5.38 | 26.41 | 26.71 | 26.47 | 25.12 |

Example 8

Measurement of Surface Area and Porosity

In order to assess the porosity of COPs, Ar adsorption isotherms were obtained by the Micromeritics ASAP 2020 Accelerated Surface Area and Porosimetry at 87K, and samples were used after degassing at 150° C. under a vacuum for 5 hours.

An adsorption-desorption isotherm was obtained with given BET (P/P$_0$=0.01-0.25) and Langmuir (P/P$_0$=0.1-0.35) surface areas.

Figure 8:
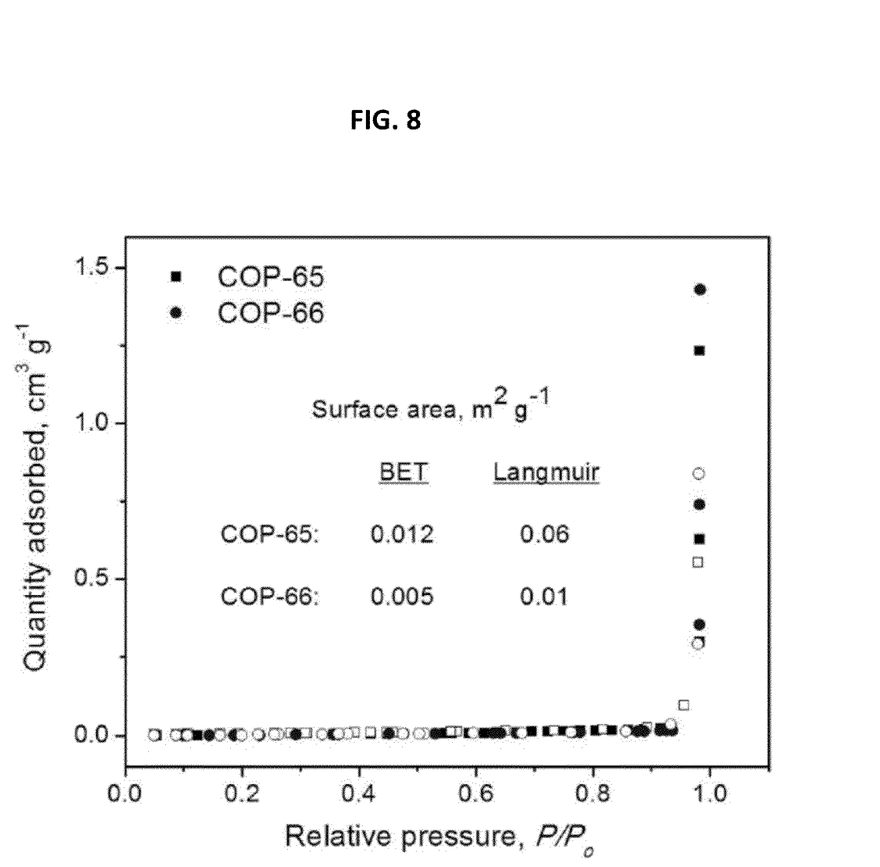
FIG. 8 is a graph showing the results of Ar adsorption-desorption at (87K) for COPs.

FIG. 8 shows the results of measuring the surface areas and porosities of COP-65 and COP-66, synthesized in Example 1, by BET and Langmuir. As can be seen in FIG. 8, COP-65 and COP-66 showed BET surfaces of 0.012 and 0.005 m²/g, respectively, and Langmuir surface areas of 0.06 and 0.01 m²/g, respectively.

As expected, the Brunauer-Emmett-Teller (BET) surface area was insignificant, and COP-65 and COP-66 were non-porous, because the building block monomers are flexible aliphatic molecules that contribute to the high crosslinking degree of the polymers.

Example 9

Powder X-Ray Diffraction Pattern Analysis of COPs

The powder X-ray diffraction patterns of COPs were acquired from 0.5-80° by a Rigaku D/MAX-2500 (18 kW) micro-area X-ray diffractometer.

Figure 9:
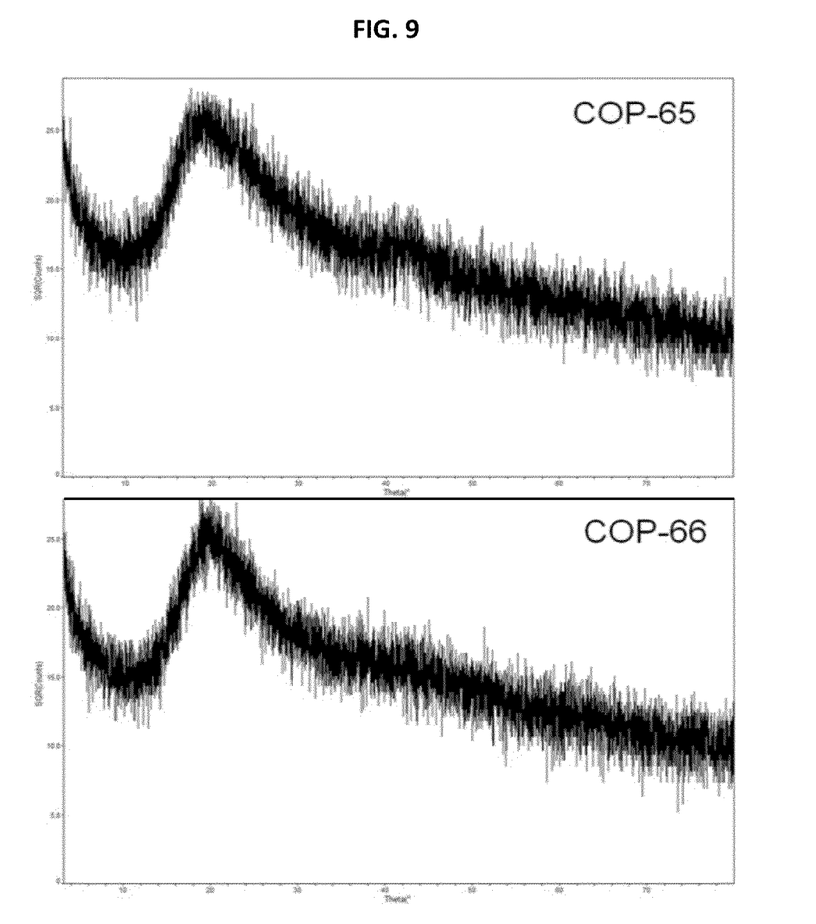
FIG. 9 shows the powder X-ray diffraction patterns of COPs.

FIG. 9 shows the results of measuring the powder X-ray diffraction patterns of COP-65 and COP-66 (synthesized in Example 1) by a micro-area X-ray diffractometer. As can be seen therein, only one Bragg diffraction broad peak appeared at around 20. This result suggests that the polymer networks are certainly amorphous materials.

INDUSTRIAL APPLICABILITY

The disulfide-linked organic polymer according to the present invention can be easily synthesized from a commercial monomer without using an expensive catalyst, and can selectively absorb only organic solvents in aqueous solutions or wastewaters. Thus, the inventive disulfide-linked organic polymer will be used in a wide range of applications, including water treatment processes.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A disulfide-linked organic polymer represented by following Formulas 1 or 2:

Formula 1

Formula 2 wherein n is an integer ranging from 10 to 20,000.

2. A method of preparing a disulfide-linked organic compound, comprising the steps of:
   (a) reacting a trivalent or tetravalent aliphatic monomer comprising a thiol group with an oxidizing agent, thereby obtaining a precipitate in a polar protic solvent; and
   (b) soaking the precipitate obtained in the step (a), in an organic solvent to remove unreacted monomer, thereby obtaining a gel-like polymer.

3. The method of claim 2, wherein the trivalent aliphatic monomer is trimethyllolpropane tris(3-mercaptopropionate), and the tetravalent aliphatic monomer is pentaerythritol tetrakis(3-mercaptopropionate).

4. The method of claim 2, wherein the oxidizing agent is selected from the group consisting of dimethyl sulfoxide (DMSO), sodium hydroxide (NaOH) and potassium iodide (KI).

5. The method of claim 2, wherein the polar protic solvent is water or alcohol, and the organic solvent is selected from the group consisting of tetrahydrofuran (THF), acetone, N,N-dimethylformamide (DMF), and 1,2-dichloroethane (DCE).

6. The method of claim 2, wherein the reaction in the step (a) is performed at a temperature of 70-100° C.

7. The method of claim 2, wherein the step (b) is performed 2-6 times.

8. A method of using the disulfide-linked organic polymer of claim 1 as an organic solvent absorbent.

9. The method of claim 8, wherein the organic solvent is present in aqueous solutions or wastewater.

10. An organic solvent absorbent comprising the disulfide-linked organic polymer of claim 1.

11. The organic solvent absorbent of claim 10, wherein the organic solvent is present in aqueous solutions or wastewater.

* * * * *